United States Patent [19]
Cosby

[11] 3,826,092
[45] July 30, 1974

[54] CLOSED CYCLE ENERGY CONVERSION SYSTEM

[76] Inventor: Thomas L. Cosby, 10713 S. Michigan Ave., Chicago, Ill. 60643

[22] Filed: Sept. 18, 1972

[21] Appl. No.: 289,953

[52] U.S. Cl............................ 60/643, 60/641, 60/655
[51] Int. Cl............................................. F01k 25/00
[58] Field of Search ...................... 60/36, 37, 38, 50

[56] References Cited
UNITED STATES PATENTS

| | | | |
|---|---|---|---|
| 1,032,236 | 7/1912 | Patten | 60/36 X |
| 1,575,967 | 3/1926 | Brodton | 60/36 UX |
| 3,077,073 | 2/1963 | Kuhrt | 60/36 X |
| 3,101,592 | 8/1963 | Robertson et al. | 60/50 UX |
| 3,266,246 | 8/1966 | Heller et al. | 60/38 |
| 3,471,274 | 10/1969 | Quigley | 60/36 |
| 3,692,459 | 9/1972 | Erb | 60/36 |

*Primary Examiner*—Edgar W. Geoghegan
*Assistant Examiner*—H. Burks, Sr.

[57] ABSTRACT

A system for utilizing heat energy to perform work has closed cycle fuel and power subsystems.

In the fuel subsystem water is disassociated by electrolysis in a generator chamber. The hydrogen and oxygen are burned in a combustion chamber, evaporating a working fluid in an evaporator chamber of the power subsystem. The temperature of the combustion chamber is such that water is discharged as steam under pressure and operates an air motor to drive a generator. The steam is then condensed and pumped back to the fuel generating chamber.

In the power subsystem the evaporated working fluid drives a turbine to perform work. The discharge from the turbine operates a low pressure motor to drive a second generator. The working fluid is cooled in a heat exchanger to the liquefaction temperature, liquefied by a compressor and returned to the evaporator.

Both generators supply electrical energy to the fuel generator and additional electrical energy is supplied as needed from an outside source.

16 Claims, 2 Drawing Figures

PATENTED JUL 30 1974 3,826,092

CLOSED CYCLE ENERGY CONVERSION SYSTEM

This invention is concerned with an energy conversion system which utilizes closed fuel and heat energy conversion subsystems and which has both high efficiency and minimal environmental effect.

A principal feature of the invention is that the heat energy conversion subsystem utilizes a heat transfer medium which is vaporized and drives a turbine to produce work, at a relatively low pressure. The heat transfer medium is then cooled to the vaporization point, compressed to the liquid state, without giving up heat and reused through the system.

Another feature is a closed fuel subsystem utilizing water. The water is electrically disassociated, separating it into hydrogen and oxygen gases that are recombined in a combustion chamber giving up heat which vaporizes the heat transfer medium of the heat energy conversion subsystems. Steam is a byproduct and is cooled and reused.

A further feature is that the vapor discharges of the heat energy transfer medium from the turbine and the water from the combustion chamber power low pressure air motors which drive electrical generators providing a portion of the electrical energy required for operating the fuel subsystem.

Further features and advantages of the invention will readily be apparent from the following specification and from the drawings, in which.

Figure 1:
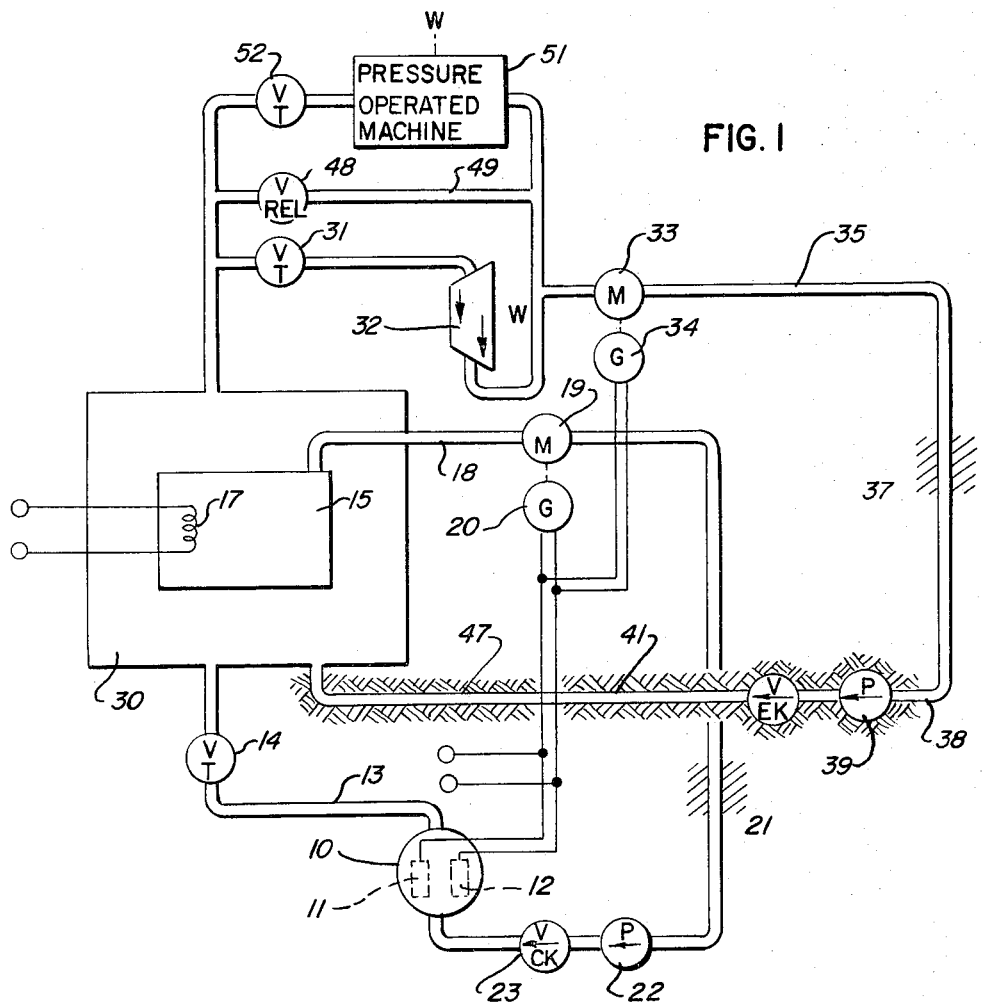
FIG. 1 is a diagrammatic illustration of a system embodying the invention.

In the following description the elements of the fuel subsystem will be identified with reference numerals beginning at 10 while the elements of the heat energy conversion subsystem are identified by reference numerals beginning at 30.

The system utilizes a fuel, as water, the elements of which may be disassociated and then recombined giving up heat. A fuel generator 10 has electrodes 11 and 12 therein connected with a suitable source of electrical power, as will appear, and the water is disassociated, forming hydrogen and oxygen gases which are conducted through pipe 13 and throttle valve 14 to a combustion chamber 15. Igniter coil 17 is connected with a source of electrical energy and provides initial heat to start combustion of the hydrogen and oxygen gases which recombine in the combustion chamber yielding water in the form of steam and giving off heat. Steam from combustion chamber 15 is conducted through pipe 18 to a low pressure air motor 19 which drives an electrical generator 20. The steam, reduced in temperature and pressure at the outlet of motor 19 is further cooled in heat exchanger 21, condensing it to water which is returned by pump 22 through check valve 23 to fuel source 10.

The electrical output of generator 20 is connected with electrodes 11 and 12 providing a portion of the electrical energy required for disassociating the fuel into its components. The fuel subsystem discharges only a small amount of heat into the atmosphere. There are no combustion byproducts or other pollutants given off.

The power or heat energy conversion subsystem utilizes a heat transfer fluid having a relatively low boiling point, as methyl chloride which boils at 156°. The liquid fluid is evaporated in an evaporator chamber 30 which surrounds the combustion chamber 15. The gaseous fluid at a relatively low pressure of the order of 100 psi is connected through a throttle valve 31 with a machine 32, as a low pressure air motor, which produces work, W, and may be used for any desired purpose as in powering a vehicle. Throttle valve 31 controls the speed of the turbine.

The working fluid discharged from the motor 32 is still in a gaseous state and at a pressure of the order of 30 to 40 psi. It is connected with a low pressure air motor 33 which drives a generator 34, the output of which may be connected in parallel with that of generator 20, providing an additional electrical input to the fuel generator 10. The pressure of the fluid is reduced by about 20 psi passing through motor 33. The working fluid is connected through pipe 35 with heat exchanger 37, the output of which is connected through pipe 38 with a compressor pump 39. The working fluid at the output of heat exchanger 37 remains in gaseous form but is cooled to the liquefaction temperature. Compressor 39 liquefies the fluid at this temperature and returns it through check valve 40 and pipe 41 to the evaporation chamber 30.

Figure 2:
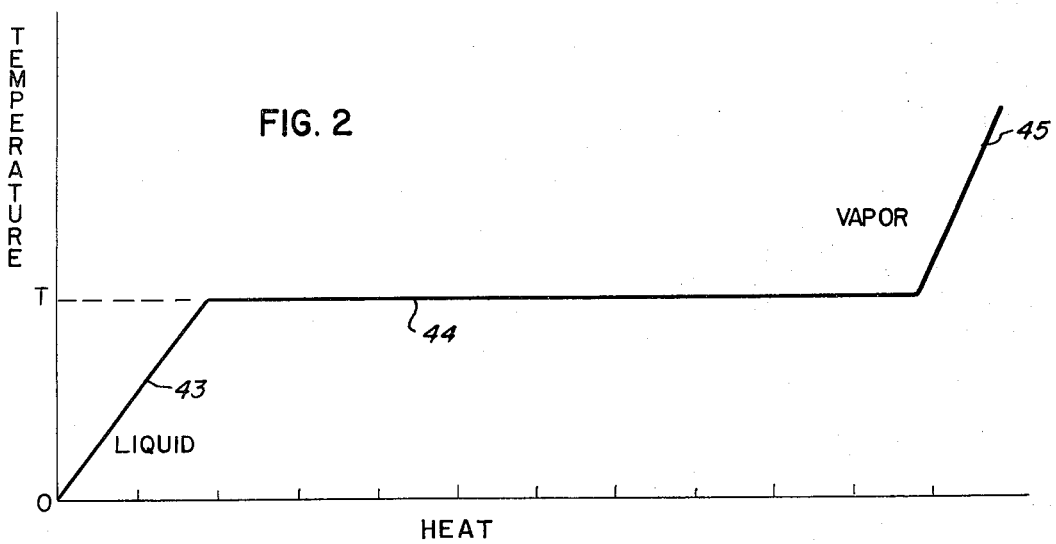
FIG. 2 is a curve of the temperature-heat relationship for the heat transfer medium of the heat energy conversion subsystem.

The importance of the pressure-temperature conditions in the efficient operation of the system is illustrated in the curve of FIG. 2. As the fluid in a liquid form is heated, its temperature rises linearly, along the portion 43 of the curve. When the vaporization temperature T is reached, a large input of heat is required to vaporize the fluid, without a temperature increase. This is represented by portion 44 of the curve. An additional input of heat to the vaporized liquid results in an increase in both temperature and pressure, portion 45 of the curve. By liquefying the vapor which has been cooled to the liquefaction temperature, but without giving up the heat required for vaporization, the heat input requirements for the systems are minimized. In order to conserve the heat in the operating fluid, compressor 39, check valve 40, pipe 41 and evaporation chamber 30 are provided with a covering 47 of heat insulating material.

A relief valve 48 is connected in a bypass line 49 around throttle valve 31 and motor 32. The bypass prevents the buildup of excessive pressure in evaporator 30, particularly when throttle valve 31 is partially or completely closed reducing or shutting off the flow of operating fluid to the motor 32.

A pressure operated machine 51 producing work W' is connected through throttle valve 52 with evaporator 30 and has its discharge connected with motor 33. Pressure operated machine 51 may be utilized in conjunction with or in place of motor 32 depending on the work requirements and capacity of the system.

The heat energy conversion subsystem requires no working fluid input and has no discharge to the atmosphere except for heat through exchanger 37 which may be necessary to reduce the fluid temperature to the liquefaction point before it is returned to the evaporator.

I claim:

1. An energy conversion system with a closed fuel subsystem having a fluid fuel therein and a closed heat energy conversion subsystem having a fluid heat exchange medium therein, comprising:

a fuel component generator in said fuel subsystem;

a combustion chamber connected with said fuel component generator and having an exhaust for combustion products;

means for returning the combustion products to said fuel component generator;

an evaporator in heat exchange relation with the combustion chamber and having an output for evaporated heat exchange fluid under pressure;

means for deriving work from said pressurized, evaporated heat exchange fluid, connected with said evaporator outlet and having an outlet for low pressure, evaporated heat exchange fluid; and means for returning said heat exchange fluid, in a liquid state, to said evaporator.

2. The energy conversion system of claim 1 in which said means for deriving work includes a low pressure air motor having an inlet connected with the outlet of said evaporator and having an outlet for low pressure heat exchange fluid.

3. The energy conversion system of claim 2 including a second motor driven by the low pressure fluid from the outlet of said low pressure air motor.

4. The energy conversion system of claim 1 including means for cooling the low pressure heat exchange fluid to its vaporization temperature and a compressor connected with said cooling means for liquefying the heat exchange fluid and returning it to said evaporator.

5. The energy conversion system of claim 4 in which the compressor and its connection with the evaporator are insulated to prevent heat loss from the liquefied heat exchange fluid.

6. The heat energy conversion system of claim 2 including a pressure controlled bypass around said motor.

7. The heat energy conversion system of claim 3 including means for deriving power from said second motor for operating said fuel component generator.

8. The energy conversion system of claim 1 in which the means for returning the combustion products from the combustion chamber to the fuel component generator includes a motor driven by said combustion products and an electric generator powered by said motor.

9. The energy conversion system of claim 1 in which said fuel subsystem includes a heat exchanger for cooling the combustion products and a pump for returning the combustion products to said fuel component generator.

10. The energy conversion system of claim 1 in which said fuel subsystem utilizes water as the fluid fuel, said fuel component generator includes means for electrically decomposing the water into hydrogen and osygen and the combustion chamber includes means for igniting the hydrogen and oxygen, causing them to recombine forming steam.

11. The energy conversion system of claim 10 including a motor connected with said means for returning combustion products to the fuel component generator, another motor connected with the low pressure fluid outlet of said work deriving means, an electric generator driven by each motor and means connecting the outputs of the electric generators to power the fuel component generator.

12. The energy conversion system of claim 1 including a throttle valve connected between said fuel component generator and said combustion chamber.

13. The energy conversion system of claim 2 including a throttle valve connected between said evaporator and said low pressure air motor.

14. The method of converting heat to work, comprising:

evaporating a liquid heat transfer fluid under pressure by providing heat thereto;

expanding said heat transfer fluid through a motor to perform work;

maintaining the fluid discharge from said motor as a gas at a temperature above the vaporization point for the pressure thereof;

cooling said fluid to the temperature of vaporization;

compressing said fluid to liquefy it, the fluid retaining the heat of vaporization; and repeating the process utilizing the liquefied fluid, the heat provided to evaporate the liquefied fluid not including the heat of vaporization.

15. The method of claim 14 in which said fluid has a boiling point below that of water.

16. The method of claim 15 in which said heat exchange fluid is methyl chloride.

* * * * *